FIG. 6

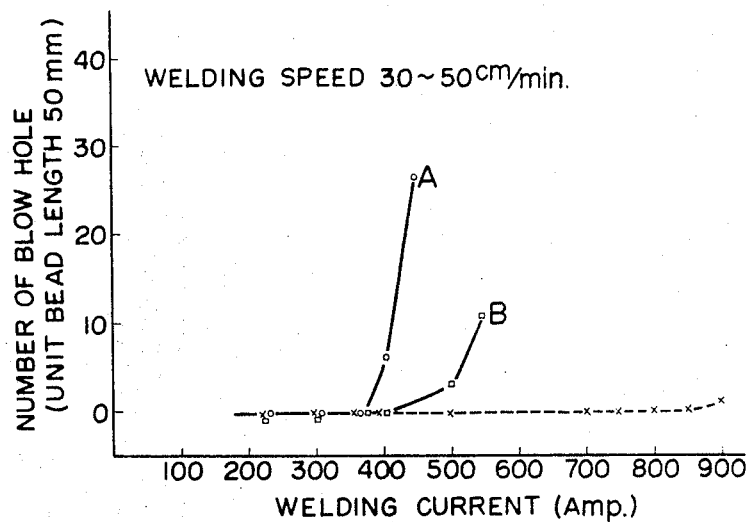
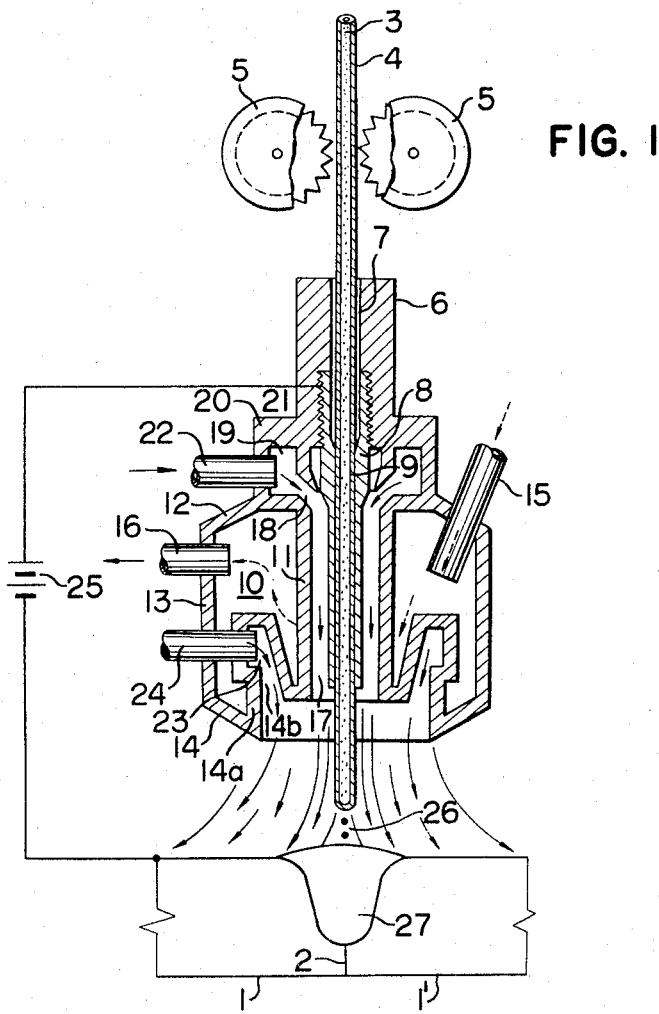

| BASE METAL | | JOINT DESIGN | PASS | WELDING CONDITIONS | | | | MECHANICAL PROPERTIES OF WELDED JOINT | | |
|---|---|---|---|---|---|---|---|---|---|---|
| MATERIAL | PLATE THICK-NESS | | | CURRENT amp. | ARC VOLTAGE VOLTS | WELDING SPEED mm/min | SHIELD GAS l/min. | TENSIL STRENGTH kg/mm² | FREE BEND TEST % | 2 mm V-NOTCH CHARPY kg-m/cm² (AT 0°C) |
| MILD STEEL | 30 | | 1 | 700 | 28 | 200 | $CO_2$:10 | 51.7 | 30.0 | 5.7 mean 3.7 (4.4) |
| | | | 2 | 750 | 29 | 200 | Ar :10 | 51.6 | 28.8 | 3.9 |
| HIGH TENSILE STEEL (50 kg/mm²) | 19 | | 1 | 600 | 30 | 390 | $CO_2$:10 | 59.7 | 44.6 | 4.8 mean 6.0 (5.5) |
| | | | 2 | 700 | 29 | 390 | Ar :10 | 60.2 | 46.6 | 5.8 |
| HIGH TENSILE STEEL (60 kg/mm²) | 25 | | 1 | 700 | 32 | 300 | $CO_2$:10 | 61.5 | 36.2 | 8.1 mean 6.8 (7.0) |
| | | | 2 | 750 | 33 | 300 | Ar :10 | 61.8 | 40.0 | 6.2 |

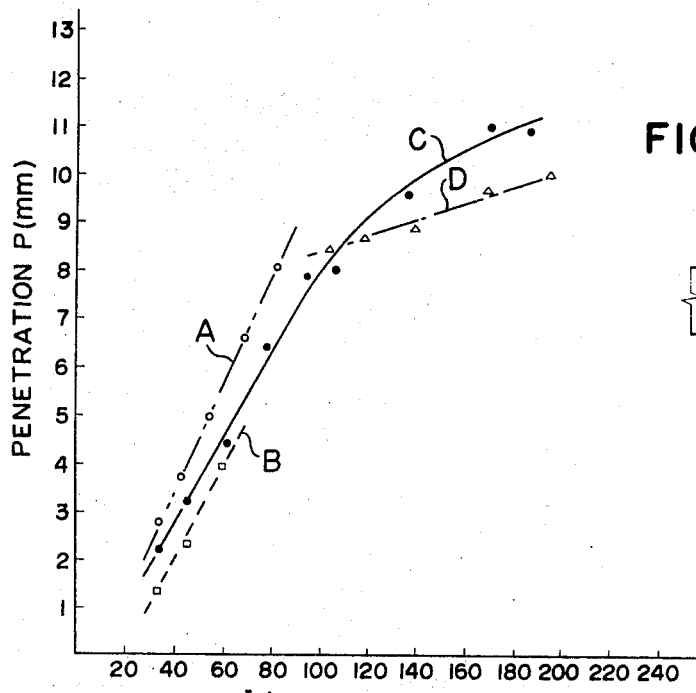

FIG. 5

I/√V

I: WELDING CURRENT (Amp.)
V: WELDING SPEED (cm/min.)

United States Patent Office 3,473,002
Patented Oct. 14, 1969

3,473,002
TRIPLY SHIELDED ARC WELDING METHOD
Kazuhisa Suzuki, Kobe-shi, Japan, assignor to Mitsubishi Jukogyo Kabushiki Kaisha, Tokyo, Japan
Filed Sept. 10, 1965, Ser. No. 486,320
Int. Cl. B23k 9/00
U.S. Cl. 219—137    2 Claims

ABSTRACT OF THE DISCLOSURE

In a sigma welding method the welding electrode is a cored metallic welding wire enclosing a flux containing alloying constituents. The welding operation is shielded by a first annular stream of an inert gas immediately surrounding the welding wire, and by a second annular stream of $CO_2$ surrounding the first annular stream. The welding apparatus includes a cooling chamber having water circulated therethrough, walls defining a first annular nozzle for the inert gas and walls defining a second annular nozzle for the stream of $CO_2$. The cooling chamber has walls common with both nozzles whereby both the inert gas and the $CO_2$ are directly cooled.

---

Figure 3:
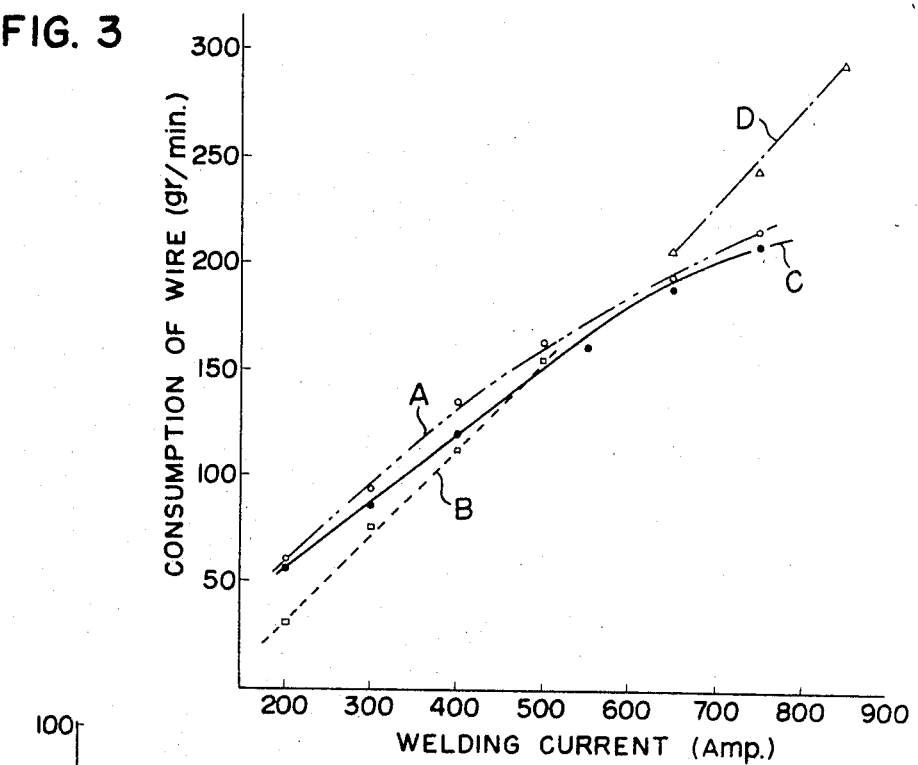

The present invention relates to a method and an apparatus for triply shielded arc welding by means of a cored wire having a flux enclosed therein.

In a conventional shielded arc welding method using a cored wire enclosing a flux, the arc is shielded with $CO_2$ gas. The weight of the flux capable of being enclosed in the cored wire is limited to 10–20% of the total weight of the cored wire. If the welding is to be performed with a high density of electric current, the absolute amount of the flux becomes insufficient for the increased rate of molten metal deposition, while oxidation of the molten metal is substantially increased. The result is poor deoxidation of the molten metal with a limited slag, and the molten metal is so oxidized that it provides a porous weld deposit.

Furthermore, in such an operation, oxidation and spatter are increased, the deposition rate is decreased, and the surface of the deposited metal is very uneven due to the small amount of slag produced. On the other hand, when a larger size cored wire is used to enclose an increased amount of flux, uniform enclosure of the flux in the cored wire becomes difficult, resulting in manufacturing difficulties. Also, concentration of the force of the arc is poor, with the result that the penetration of the work pieces decreases and even a high density current cannot be effectively used.

The primary object of this invention is to provide a welding method by which a deposited metal of deep penetration and deoxidized sufficiently can be obtained by means of a small size cored wire having a flux enclosed therein.

Another object of this invention is to provide a welding method in which the arc and molten metal are shielded triply by a flux, an inert gas and $CO_2$ gas.

Another object of this invention is to provide a welding method in which the arc between a fine cored wire and the base metal is protected by triple shielding, whereby a high electric current can be used effectively for the method, so that a deposited metal of deep penetration having no defects can be obtained very efficiently.

A still another object of this invention is to provide a welding torch of simple construction and long life having a double shielding gas nozzle with a cooling means. This torch can be used, when welding with a cored wire and a high current density, almost without any wear or damage due to the heat of the arc.

In order to attain the aforementioned objects according to the present invention, the welding method is characterized by producing an arc between a cored wire, having a flux enclosed therein containing alloy elements, and the metals to be welded, while shielding said arc cylindrically with an inert gas stream. The molten metal is transferred, while shielding the arc stream and molten metal with a $CO_2$ gas stream surrounding said inert gas stream. Thereby the arc and the molten metal are triply shielded with flux, inert gas and $CO_2$ gas, the molten metal being thus deoxidized and refined sufficiently to produce deposited metal of deep penetration.

For an understanding of the principles of the invention reference is made to the following description of a typical embodiment thereof as illustrated in the accompanying drawings.

Figure 4:
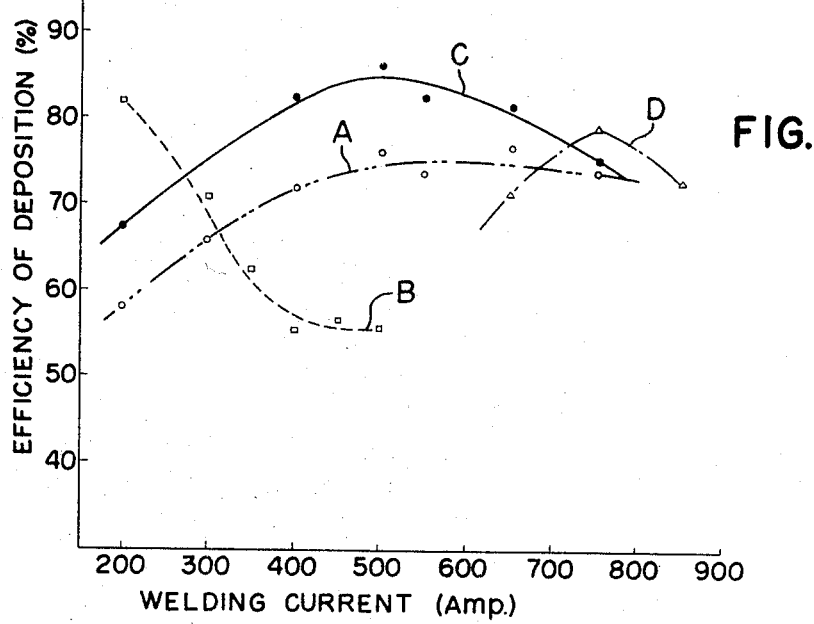

In the drawings:

FIG. 1 is a schematic longitudinal section of an example of the apparatus in which a method embodying the present invention is performed, FIG. 2 is a diagram showing the relation between the welding current and blow-holes of deposited metal in a method embodying the present invention and those in conventional methods, FIG. 3 is a diagram showing the relations between the welding current and the consumption of a wire, in the same methods as in FIG. 2, FIG. 4 is a diagram showing the relations between the welding current and the efficiency of deposition, also in the same methods as in FIG. 2, FIG. 5 is a diagram the relations between the welding current and the depth of penetration of a bead, also in the same methods as in FIG. 2, and FIG. 6 is a table of testing results of specimens treated in accordance with the present invention.

Referring to FIG. 1, the base metal pieces 1 and 1' are to be welded together at their respective end faces or joint portions 2. A cored wire 4, in which is enclosed a flux 3 containing alloy elements, is delivered into a guide tube 6 at a determined speed by an automatic wire feed device 5. The guide tube 6, serving for guidance of the wire as well as conduction of an electrical current to the wire, is provided at its inner end with a contact tip 8, along whose center line extends a boring 9 with which a boring 7 for the cored wire extending along the center line of the guide tube 6 is aligned. The contact tip 8 touches the wire 4 to conduct electric current to the same. Around and spaced from the contact tip 8, there is arranged a substantially cylindrical cooling liquid chamber 10 bordered by a cylindrical inner wall 11, a top wall 12, a cylindrical outer wall 13 and a convex bottom wall 14, and provided with a cooling liquid inlet 15 and a cooling liquid outlet 16, through which cooling liquid such as water, is continuously circulated through chamber 10.

The cylindrical inner wall 11 of chamber 10 forms an inner cylindrical nozzle, between which and the contact tip 8 an inner gas supply passage 17 is formed for flow of an inert gas, for example, such as argon, and which communicates, through an orifice 18 on its upstream side with an annular chamber 19 for the shielding gas. Chamber 19 is formed by an outer wall 20, a part of the top wall 12 of the cooling chamber 10 and an inner wall 21 projecting inwardly so as to form the orifice 18. The inner shielding gas is supplied through inlet 22 into chamber 19 and is directed through orifice 18 into the annular supply passage 17 from which an annular stream of inert gas is directed toward and around the arc, as well as around the welding wire 4.

The bottom wall 14 of the cooling chamber 10 forms a recess whose outer wall portion 14a forms, together with an opposite inner wall portion 14b, an outer gas chamber or supply passage 23. An inlet 24 for an outer shield gas, such as, for example, $CO_2$ gas, communicates with the inner end of passage 23, while an outlet on the downstream side opens around the outer end portion of the cylindrical inner wall of the cooling chamber 10, i.e., the inner cylindrical nozzle 11. Thus the shield gas supplied through the inlet 24 flows through the supply passage 23 and forms a shield surrounding the inner shield gas jetting from the inner cylindrical nozzle 11.

The work pieces 1 and 1' as well as the contact tip 8 are so connected with a welding current source 25 that an arc can be produced between the pieces 1 and 1' and the wire 4 to deposit molten 27.

In the aforementioned apparatus, the fine wire 4, having a flux 3 enclosed therein and containing alloy elements, is supplied with electric current through the contact tip 8 while being delivered by the automatic feed device 5, and produces an arc 26 above the base metal joint 2. Thereby the wire 4 and the workpieces 1, 1' are melted to produce the deposited metal 27. In this case, wire 4 melted by the high current density arc, is transferred, into the molten pool, as a spray, by the jet stream of inert gas discharged from the outer end portion of the contact tip 8. This inert gas is supplied through inlet 22 into chamber 19 and flows through orifice 18 into annular passage 17. The spray of molten metal is delivered to the work substantially without being oxidized and, because of the high current density arc, the pool of molten metal penetrates deeply into the workpieces to produce a deeply penetrating metal deposit 27. Furthermore, as $CO_2$ gas flows through the outer shield gas supply passage 23 and is discharged from the outer nozzle 14a to spread outward extensively, in order to shelter from the air the arc stream and the molten pool and thereby to avoid the disadvantageous influences of $N_2$, $O_2$ in the air upon the arc stream and the molten pool, the arc and the molten pool are protected completely from the air by a triple shield consisting of the flux, the inert gas and $CO_2$ gas. Thereby excessive oxidation of the molten metal is prevented very completely.

During the aforementioned welding operation the outer gas nozzle 14a and the inner gas nozzle 11 would be heated to very high temperatures. According to this invention, however, the cooling liquid chamber 10 is provided with wall portions which are common with the walls of gas nozzles 11 and 14a, so that these nozzles are cooled forcedly by the cooling liquid supplied to chamber 10 through inlet 15 and discharged from outlet 16, with the result that heat damage of these nozzles can be prevented.

As mentioned above, even when welding is performed using a fine cored wire, having a flux enclosed therein and containing alloying constituents, and using a high density electric current, the arc is shielded by an inert gas stream in which molten metal transfers into a molten pool, so that oxidation and consumption of the molten drops are substantially prevented and the effective functions of the flux, containing alloying constituents, are efficiently put to practical use. Further, the arc stream is sheltered completely from the air by $CO_2$ gas, and thus the arc and the molten metal are shielded triply by the flux, the inert gas and $CO_1$ gas, so that the molten metal is deoxidized, and refined perfectly with no blowholes and the mechanical properties of the deposited metal are very excellent. Furthermore, according to this invention, as oxidation of the molten metal drops is slight, the efficiency of deposition becomes very high, resulting in highly efficient welding.

In the present invention, as welding can be performed by means of a fine wire at a high electric current density, an ultra-high temperature arc plasma at the arc point is concentrated at a point and, as the absolute amount of the flux is small there does not exist an arc cushion due to slag, so that the molten pool penetrates deeply into the base metal pieces. This results in a deposited metal of a very deep penetration, so that single layer welding of thick plates can be performed at a high speed.

Nextly, the present invention will be explained with reference to some practical and concrete examples of the welding process.

FIG. 2 shows the relations between the welding current and the number of blowholes produced, FIG. 3 shows the relations between the welding current and the consumption of wire, and FIG. 4 shows the relations between the welding current and the efficiency of deposition, while FIG. 5 shows the relations between the welding current and the depth of penetration of a bead. All cases relate to the welding of a bead under various welding conditions, by using a cored wire of 3.2 mm. outside diameter having a flux, containing alloying constituents, enclosed therein for welding of mild steel plate of 30 mm. thickness.

In these figures, A represents the results of a conventional D.C. reverse polarity welding process in which shielding is effected by $CO_2$ gas only. B represents the results in the same process using an alternating current source, while C represents the results of the triply or conjointly shielded arc welding process of the present invention using a direct current source in reverse polarity connection and D represents the results of the same triply or conjointly shielded welding process using an alternating current source.

Referring to FIG. 2, according to the conventional process, when the welding value reaches a current of about 400 a., in case of A, and 500 a., in case of B, the molten metal produces many blowholes and with increase of the current intensity the deposited metal becomes very porous. To the contrary, in the welding process according to the present invention, even when the welding value reaches a high current of 900 a., the deposited metal remains substantially non-porous, as shown by line C, owing to the effectiveness of triple shielding.

Next, referring to FIGS. 3 and 4, in the conventional process consumption of the wire per unit time is relatively large, as shown by lines A and B, and efficiency of deposition, nevertheless, is remarkably low, in comparison with that in the process of this invention as shown in FIG. 4. Especially, in the case of B, the efficiency of deposition decreases with increase of the current intensity. This proves that in the present invention and owing to the effects of the triple shield, oxidation and consumption of the molten drops are restrained strikingly, so that the welding process of present invention has a high efficiency. As shown in FIG. 5, in the conventional process welding by a high electric current is impossible, as shown by lines A and B, while in the region of a high current, the welding process of this invention brings the deepest penetration, as shown by line C. This means that high speed welding with deep penetration is possible only according to this invention.

By the welding process of this invention, butt weld joints were manufactured from mild steel plates of 30 mm. thickness, high tensile steel plates of 19 mm. thickness having a tensile strength of 50 kg./mm.², and high tensile steel plates of 25 mm. thickness having a tensile strength of 60 kg./mm.², respectively, under the conditions as shown in the table in FIG. 6. All the cored wires used in making these welds were of 3.2 mm. outside diameter. For the mild steel plates, the wire enclosed therein a flux of the titania system containing ferromanganese and ferrosilicon as alloy elements, so that contents of Mn and Si in the deposited metal were 1.00–1.30% and 0.40–0.60%, respectively. For the high tensile steels, the fluxes included ferrozirconium in addition to the aforementioned alloy elements, so that the deposited metal had a Zr content of 0.003%. Actually, the content of Zr in this case can range from 0.001% to 0.02%. The test results of these welded joints as to tensile strength, bend test and charpy value were very satisfactory as shown in the table in FIG. 6. When these joints were manufactured by a conventional welding process, which can not use a high electric current, all the steel plates had to be subjected to a multilayer welding with more than five passes, so that the welding efficiency of the conventional process was less than ⅕ of that of the process of this invention.

From the foregoing one can easily understand that only by the present invention is welding at a high speed, of a high efficiency and a superior quality possible.

What is claimed is:

1. A shielded inert gas metallic arc welding method comprising the steps of establishing an arc between metallic workpieces and a cored metallic welding wire enclosing a flux containing alloying constituents including zirconium in an amount sufficient to provide 0.001–0.02% zirconium in the weld deposit; feeding the welding wire toward the workpieces to form a weld deposit; shielding the welding wire, the arc and the molten metal by directing a first annular stream of argon toward the workpieces and substantially coaxial with the welding wire; and laterally enclosing said first annular stream of argon in a second annular stream of $CO_2$ gas directed toward the workpieces and substantially coaxial with the first annular stream of argon; whereby the arc and the molten metal are shielded conjointly by the flux, the inert gas and the $CO_2$ gas to deoxidize and refine the molten metal to provide a weld deposit characterized by deep penetration into the workpieces.

2. A shielded inert gas metallic arc welding method, as claimed in claim 1, including the step of maintaining, in said welding wire, an electric current density of at least 80 a. per mm.$^2$.

References Cited
UNITED STATES PATENTS

| | | | |
|---|---|---|---|
| 2,758,186 | 8/1956 | Ludwig | 219—130 X |
| 2,806,124 | 9/1957 | Gage | 219—130 X |
| 2,864,934 | 12/1958 | Bernard et al. | 219—74 |
| 2,868,950 | 1/1959 | Gage | 219—74 |
| 3,185,813 | 5/1965 | Kennedy | 219—74 |
| 3,309,490 | 3/1967 | Cary | 219—74 |

JOSEPH V. TRUHE, Primary Examiner

J. G. SMITH, Assistant Examiner

U.S. Cl. X.R.

219—74